(12) United States Patent
Moll et al.

(10) Patent No.: US 11,235,737 B2
(45) Date of Patent: Feb. 1, 2022

(54) TEMPERATURE CONTROL APPARATUS FOR CONTROLLING THE TEMPERATURE OF OBJECTS

(71) Applicant: EISENMANN SE, Böblingen (DE)

(72) Inventors: Mathias Moll, Weil im Schönbuch (DE); Reiner Erhardt, Stuttgart (DE); Günter Eberhard, Nagold (DE)

(73) Assignee: EISENMANN SE, Böblingen (DE)

( * ) Notice: Subject to any disclaimer, the term of this patent is extended or adjusted under 35 U.S.C. 154(b) by 94 days.

(21) Appl. No.: 16/449,662

(22) Filed: Jun. 24, 2019

(65) Prior Publication Data
US 2019/0389434 A1    Dec. 26, 2019

(30) Foreign Application Priority Data

Jun. 25, 2018    (DE) ............... 10 2018 115 234.5

(51) Int. Cl.
*B60S 3/00*    (2006.01)
*F26B 3/00*    (2006.01)

(52) U.S. Cl.
CPC ............. *B60S 3/002* (2013.01); *F26B 3/00* (2013.01); *F26B 2210/12* (2013.01)

(58) Field of Classification Search
CPC ........ B60S 5/00; F26B 2210/12; F26B 25/12; F26B 25/06; F26B 15/12; F26B 21/10; B05B 16/95

See application file for complete search history.

(56) References Cited

U.S. PATENT DOCUMENTS

| | | | |
|---|---|---|---|
| 3,468,036 A | 9/1969 | Blaettler | |
| 2006/0055091 A1* | 3/2006 | Doll | F26B 21/04 266/78 |
| 2007/0144036 A1 | 6/2007 | Katefidis et al. | |
| 2019/0323772 A1 | 10/2019 | Kato et al. | |

FOREIGN PATENT DOCUMENTS

| | | | |
|---|---|---|---|
| CH | 469 237 | | 2/1969 |
| CH | 672 836 | | 12/1989 |
| DE | 10 2004 042 855 | | 1/2006 |
| DE | 10 2005 061 973 | | 6/2007 |
| EP | 2 775 240 | | 9/2014 |
| JP | 2004-050021 | | 2/2004 |
| JP | 2004050021 | * | 2/2004 |
| WO | 2018101178 | | 6/2018 |

* cited by examiner

*Primary Examiner* — Elizabeth J Martin
(74) *Attorney, Agent, or Firm* — Schroeder Intellectual Property Law Group, LLC

(57) ABSTRACT

A temperature control apparatus for controlling the temperature, in particular for the drying, of objects, in particular vehicle bodies, having a housing, in which a cooling zone having a cooling chamber that defines a longitudinal direction is accommodated. The cooling chamber is assigned at least one cooling-air temperature control device, by means of which temperature-controlled cooling air can be produced, which can be fed to the cooling chamber. In the longitudinal direction, the cooling zone comprises a supply chamber on one longitudinal side of the cooling chamber, in which supply chamber the cooling-air temperature control device is arranged.

13 Claims, 6 Drawing Sheets

TEMPERATURE CONTROL APPARATUS FOR CONTROLLING THE TEMPERATURE OF OBJECTS

RELATED APPLICATIONS

The present application claims priority to German Patent Application No. 10 2018 115 234.5 filed Jun. 25, 2018, the contents of which is fully incorporated herein by reference.

FIELD OF THE INVENTION

The invention relates to a temperature control apparatus for controlling the temperature, in particular for the drying, of objects, in particular vehicle bodies, having
a) a housing, in which a cooling zone having a cooling chamber that defines a longitudinal direction is accommodated;
wherein
b) the cooling chamber is assigned at least one cooling-air temperature control device, by means of which temperature-controlled cooling air can be produced, which can be fed to the cooling chamber.

BACKGROUND OF THE INVENTION

In such commercially available installations, freshly painted vehicle bodies, in particular, but also parts of vehicle bodies or other objects are dried. Dryers of this kind normally have a drying zone, in which, inter alia, air is drawn in from a temperature control chamber, usually designed as a temperature control tunnel, and generally from tunnel sections of short length in relation to the total length of the temperature control tunnel, heated in a heating appliance by means of a heat exchanger and fed back to the temperature control tunnel or corresponding tunnel sections in a circuit. The heating zone is followed by a cooling zone of the type stated at the outset, in which the objects are cooled with the aid of the cooling air produced by the cooling-air temperature control device.

The cooling-air temperature control device is part of a cooling system which requires a relatively large amount of installation space and with which it is necessary to ensure that all regions of the cooling chamber can be supplied effectively and symmetrically with cooling air. The cooling system in known installations is therefore arranged centrally above the chambers to be supplied, thus ensuring a symmetrical flow profile. However, a large amount of installation space is required vertically as a result.

More recently, there has increasingly been a desire to keep the corresponding temperature control apparatus as shallow as possible since such apparatus needs to be integrated into existing plant shops.

SUMMARY OF THE INVENTION

It is therefore an object of the invention to provide a temperature control apparatus of the type stated at the outset which takes account of these ideas.

This object may be achieved in the case of a temperature control apparatus of the type stated at the outset by virtue of the fact that
c) the cooling zone comprises a supply chamber in the longitudinal direction on one longitudinal side of the cooling chamber, in which supply chamber the cooling-air temperature control device is arranged.

According to the invention, it has been recognized that a uniform supply of cooling air to the cooling chamber can be ensured, even when significant components of the cooling system, especially the cooling-air temperature control device, are arranged laterally. This proves to be a success even if a supply chamber of this kind is provided on only one longitudinal side of the cooling chamber, while, on the one hand, it may be sufficient for cooling air to be blown into the cooling chamber on only one side and, on the other hand, it is also possible for cooling air of the desired uniformity in respect of temperature and flow behavior to be blown in on the opposite side of the cooling chamber.

For good distribution of the cooling air, it is advantageous if the supply chamber comprises a conditioning chamber and a pressure chamber connected fluidically thereto, wherein the cooling-air temperature control device is arranged in an equipment region of the conditioning chamber and is connected fluidically on its outlet side to the pressure chamber, wherein the pressure chamber is arranged between the cooling chamber and the conditioning chamber and is connected fluidically to the cooling chamber by one or more air injection nozzles.

It is advantageous if the conditioning chamber comprises an intake region, to which the inlet side of the cooling-air temperature control device is fluidically connected and to which air can be fed. The air fed in can be especially exterior air but can also be recirculated exhaust air from the cooling chamber or a mixture of such exhaust air and exterior air.

To ensure the purity of the cooling air blown into the cooling air, one or more filter units, through which the temperature-controlled cooling air can flow, are preferably arranged between the conditioning chamber and the pressure chamber.

Uniform distribution of the cooling air coming from the cooling-air temperature control device can be achieved if the conditioning chamber comprises a discharge region, to which the outlet side of the cooling-air temperature control device is connected and which is separated from the pressure chamber, in particular by a filter wall, which comprises one or more filter units.

The cooling chamber can be supplied effectively with cooling air if the pressure chamber extends substantially over the length of the cooling chamber in the longitudinal direction.

It is advantageous if at least one blower, by means of which air can be delivered to the cooling-air temperature control device, through the cooling-air temperature control device and then into the cooling chamber as temperature-controlled cooling air, is arranged in the supply chamber. The air can be cooled effectively if the cooling-air temperature control device comprises a heat exchanger arrangement.

It is particularly advantageous here if the heat exchanger arrangement comprises a hot-water heat exchanger and a cold-water heat exchanger or is designed as a combined heat exchanger for hot water and cold water. In the heat exchanger arrangement, it is also possible to use fluid heat transfer media other than water; the terms "hot-water heat exchanger" and "cold-water heat exchanger" merely reflect the temperature-controlling effect of the respective heat exchangers.

The cooling zone can be assembled and installed in a particularly effective way on site if the cooling chamber is constructed with the aid of one or more cooling zone modules, of which at least one is designed as an equipment module, in which the cooling-air temperature control device can be accommodated, and/or at least one is designed as a discharge module having the discharge region, and/or at least one is designed as an intake module having the intake region.

Particularly in terms of fluid engineering, it is advantageous if a supply chamber with some or all of the characteristics and components explained above is formed on both sides of the cooling chamber.

Other advantages and aspects of the present invention will become apparent upon reading the following description of the drawings and detailed description of the invention.

BRIEF DESCRIPTION OF THE DRAWINGS

Illustrative embodiments of the invention are explained in greater detail below with reference to the drawings. In the drawings.

DETAILED DESCRIPTION OF THE INVENTION

While this invention is susceptible to embodiments in many different forms, there is described in detail herein, preferred embodiments of the invention with the understanding that the present disclosures are to be considered as exemplifications of the principles of the invention and are not intended to limit the broad aspects of the invention to the embodiments illustrated.

Figure 1:
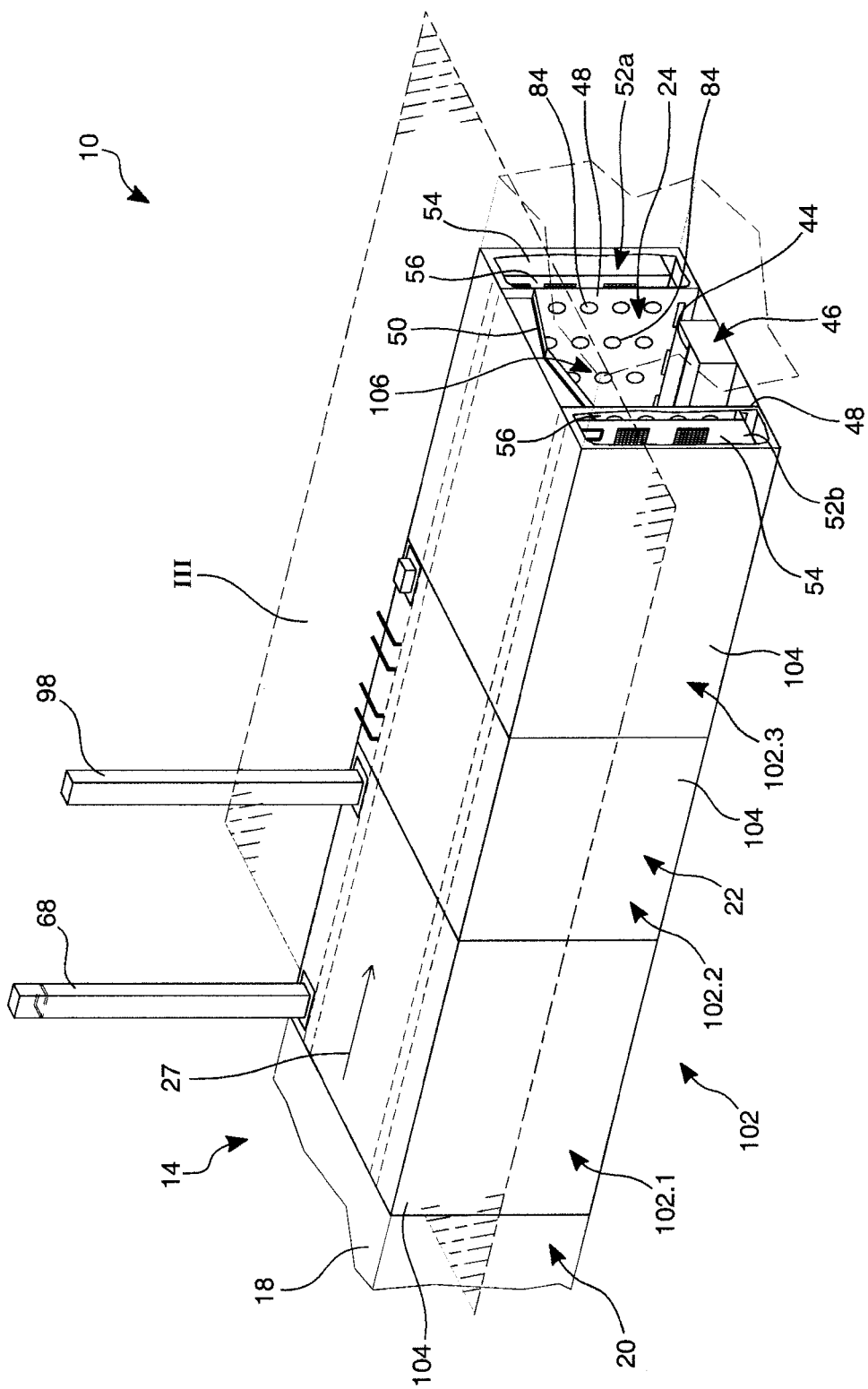
FIG. 1 shows schematically a perspective view of a cooling zone of a dryer for drying objects, wherein the cooling zone has a cooling tunnel and, on each longitudinal side of the cooling tunnel, a supply chamber, via which air temperature-controlled by a temperature control appliance can be blown into the cooling tunnel.

In FIG. 1, a temperature control apparatus for controlling the temperature of workpieces 12 shown in FIGS. 2 and 6 to 11 is denoted overall by 10. A dryer 14 is shown as an example of such a temperature control apparatus 10. A vehicle body 16 is shown in FIGS. 2 and 6 to 11 as an example of workpieces 12; however, the workpieces 12 can also be other workpieces and, in particular, components fitted to or on vehicle bodies 16, such as bumper bars, wing mirrors or the like. If appropriate, smaller workpieces 12 may be arranged on a workpiece carrier not shown specifically.

The dryer 14 comprises a thermally insulating dryer housing 18, in which a drying zone 20 shown only indicatively in FIG. 1, having a drying tunnel (not visible) and a cooling zone 22, which is shown in the figures and has a cooling chamber, which is in the form of a cooling tunnel 24 in the illustrative embodiments under consideration. The workpieces 12 to be dried are conveyed in a single pass from a tunnel inlet to a tunnel outlet of the dryer housing 18, which are not visible in the figures.

In the drying zone 20, the workpieces 12 are subjected to heated conditioned air in a manner known per se and heated to a temperature at which the desired drying process takes place. Normally, the heated air has a temperature of between 120° C. and 180° C., particularly when drying paints. When drying adhesive bonds, for example, the temperature of the heated air may also be below this and may be only 80° C. to 100° C., for example. After the drying zone 20, the workpieces 12 enter the cooling zone 22, in which they are cooled from the temperature at which the workpieces 12 leave the drying zone 18 to a temperature lower than said temperature.

Figure 2:
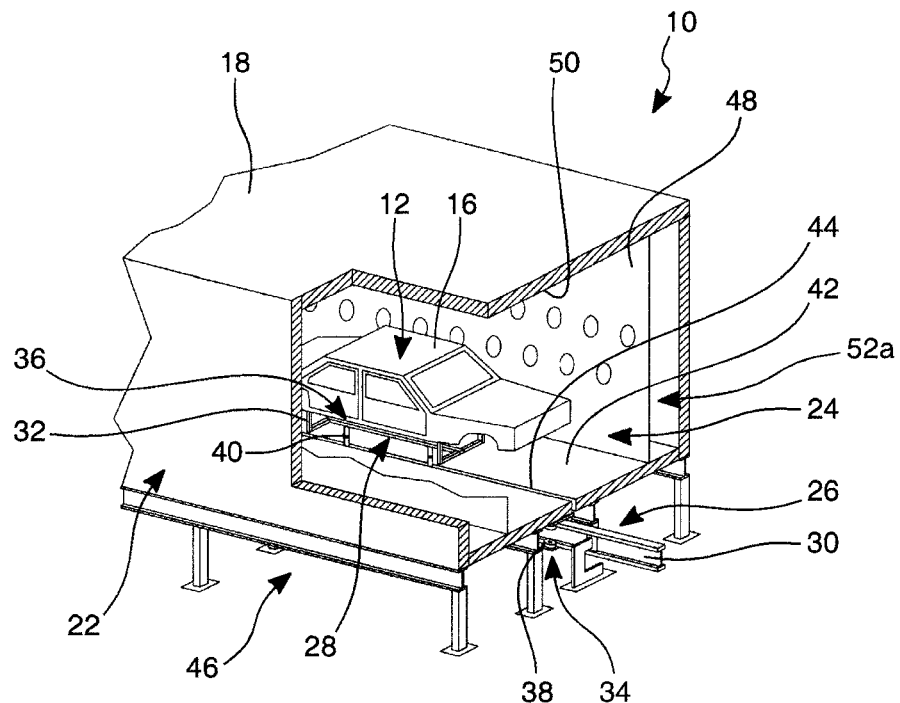
FIG. 2 shows a perspective view of one section of the dryer, in which a feed system is illustrated in more detail.

The workpieces 12 are conveyed through the dryer 14 by means of a transfer system 26 in a feed direction illustrated only in FIG. 1, which corresponds to a longitudinal direction 27 defined by the cooling tunnel 24, wherein the transfer system 26 is illustrated only in FIG. 2.

The transfer system 26 comprises a multiplicity of transfer carriages 28, of which only one is visible in FIG. 2 and on which the workpieces 12 are transferred. The transfer carriages 28 are moved on a rail system comprising a support rail 30, which is designed in a manner known per se as an I section and is anchored to the floor. The support rail 30, which is thus attached to the floor, is of single-track design. As an alternative, a multi-track, in particular dual-track rail system, can be provided.

The transfer carriage 28 comprises a fixing device 32, on which a vehicle body 16 or a corresponding workpiece carrier for workpieces 12 can be fixed. In the illustrative embodiment under consideration, the fixing device 32 is designed to receive vehicle bodies 16. For this purpose, the fixing device 32 comprises a support profile 34 having bearing bolts (not visible in FIG. 2), which interact in a manner known per se with mating elements on the vehicle body 16, thus enabling the vehicle body 16 to be fixed on the fixing device 32. It is also possible for the fixing device 32 to have several sets of such bearing bolts, which are matched to different vehicle bodies 16 of different dimensions and designs, thus enabling the fixing device 32 to be used flexibly for different vehicle body types.

The transfer carriage 28 comprises a transfer carriage running gear assembly 34, which runs on the support rail 30 and supports the fixing device 32. The transfer carriage running gear assembly 34 is coupled to the fixing device 32 by a connecting device 36. The coupling is configured in such a way that the transfer carriage 28 is also capable of traveling around curved sections of the support rail 30. For this purpose, the transfer carriage running gear assembly 34 can comprise a leading unit and a trailing unit, for example, which are connected to one another in an articulated fashion, wherein only a leading unit 38 is partially visible in FIG. 2.

In the illustrative embodiment under consideration, the connecting device 36 comprises two vertical articulated struts 40, which couple the leading unit 38 and the trailing unit to the fixing device 32. By means of a joint (not shown specially), the articulated struts 40 make it possible for the fixing device 32 to pivot around a vertical axis of rotation relative to the leading unit 38 and the trailing unit.

The transfer carriages 28 each include a dedicated drive system, enabling the transfer carriages 28 to be driven and moved independently of one another. In addition to such transfer carriages 28 with a dedicated drive system, it is also possible, where appropriate, for there to be other transfer carriages driven by a central drive system. A central drive system of this kind can be formed by a chain hoist or the like, for example. The transfer carriages 28 explained here can then accordingly be driven and moved even independently of other driving devices.

In modifications which are not shown specifically here, it is also possible to provide other conveying systems of the kind which are known per se. By way of example, roller track conveyors, chain conveyors, belt or band conveyors as well as rail systems or the like designed in a manner different from that described above, which can be operated intermittently or continuously, are suitable, in particular, for this purpose.

As can be seen in FIG. 2, the cooling tunnel 24 is delimited at the bottom by a tunnel floor 42. The tunnel floor 42 has a connecting passage 44 which is complementary with the connecting device 36 of the transfer carriages 26 and which leads to a travel space 46 for the transfer-carriage running gear assembly 34 below the cooling tunnel 24, in which the rail system comprising the support rail 30 is accommodated. In the region of the drying zone 20, the dryer 14 is designed structurally to correspond to the drying tunnel.

As a transfer carriage 28 loaded with a workpiece 12 enters the dryer 14, the connecting device 36 of the transfer carriage 28 is therefore as it were threaded into the connecting passage 44 of the tunnel floor 42. When the workpieces 12 are then conveyed through the drying tunnel and the cooling tunnel 24, the transfer-carriage running gear assembly 34 moves in the travel space 46 and guides the fixing device 32 in the drying tunnel and in the cooling tunnel 24, wherein the connecting device 36, that is to say, in the illustrative embodiment under consideration, the articulated struts 40, extends through the connecting passage 44 in the tunnel floor 42.

Screening or sealing means, which at least render more difficult or reduce an outflow of the tunnel atmosphere downwards, are provided on the connecting passage 44.

FIGS. 1 and 3 to 11, on the one hand, and FIG. 2, on the other hand, illustrate different modifications, in which the travel space 46 is designed and arranged differently. While the travel space 46 in the variant shown in FIG. 2 is completely below the tunnel floor 42, the travel space 46 in the variants shown in FIGS. 1 and 3 to 11 projects into the tunnel from below. In other words, the tunnel floor 42 has a profile with an angled cross section at that point and the connecting passage 44 is present in a section of this angled tunnel floor 42 which defines the boundary of the travel space 46 at the top.

In addition to the lower boundary of the cooling tunnel 24 formed by the tunnel floor 42, said cooling tunnel is bounded on both longitudinal sides by lateral tunnel walls 48 and at the top by a tunnel roof 50. From the center in the direction of the lateral tunnel walls 48, the tunnel roof 50 has a downward-sloping profile relative to the horizontal, thus ensuring that precipitated condensate flows off to the side, where there are drainage channels, not shown specifically here, via which this condensate can be discharged. This sloping profile is not shown in FIG. 2.

In the longitudinal direction, the cooling zone 22 has a supply chamber 52a, 52b on each of the two longitudinal sides of the cooling tunnel 24, the supply chambers, for their part, each comprising an inlet chamber 54 and a pressure chamber 56. The pressure chamber 56 is arranged between the cooling tunnel 24 and the inlet chamber 54 transversely to the longitudinal direction 27 in a lateral direction and is separated from the cooling tunnel 24 by one of the tunnel walls 48. A partition wall 58 is formed between the inlet chamber 54 and the pressure chamber 56. Only supply chamber 52a is shown schematically in FIG. 2. The pressure chamber 56 extends substantially over the length of the cooling tunnel 24 in the longitudinal direction 27.

In the vertical direction, the supply chambers 52a, 52b extend substantially over the same region as the cooling tunnel 24.

In the illustrative embodiment under consideration, the inlet chamber 54 of one of the two supply chambers 52 is a conditioning chamber 60, which is divided in the conveying direction 27 into an intake region 62, an equipment region 64 and a discharge region 66, which are connected fluidically to one another. This supply chamber is denoted by 52a, while the opposite supply chamber bears the reference sign 52b.

The intake region 62 is connected to an inlet air duct 68, via which air, in particular exterior air, can be fed to the intake region 62. If required, the exterior air is preconditioned before flowing into the intake region 62 of supply chamber 52a by means of an upstream conditioning device, in which cleaning/filtering is performed and/or dehumidification or humidification takes place in advance, for example.

The cooling tunnel 24 is assigned a cooling-air temperature control device 70, by means of which temperature-controlled cooling air is produced, which generally has a temperature of between 20° C. and 40° C. and is fed to the cooling tunnel 24. The cooling-air temperature control device 70 is arranged in supply chamber 52a. In the illustrative embodiment under consideration, the cooling-air temperature control device 70 is arranged in the inlet chamber 54 and is accommodated there in the equipment region 64 and connected on the inlet side to the intake region 62. The outlet side of the cooling-air temperature control device 70 is connected fluidically to the pressure chamber 56; this connection is made via a blower 72 and the discharge region 66. By means of the blower 72, the exterior air is delivered from the intake region 62 through the cooling-air temperature control device 70 and then as temperature-controlled cooling air into the discharge region 66, from where it flows into the pressure chamber 56. Expressed in general terms, air is delivered by the blower 72 to the cooling-air temperature control device 70, through the cooling-air temperature control device 70 and then as temperature-controlled cooling air to the cooling chamber 24.

In the illustrative embodiment under consideration, the blower 72 is likewise arranged in the equipment region 64 and downstream of the cooling-air temperature control device 70. In a modification, however, it is also possible for the blower 72 to be provided outside the equipment region 64 and/or upstream of the cooling-air temperature control device 70. In another alternative, it is also possible for there to be a blower 72 upstream and a blower 72 downstream of the cooling-air temperature control device 70.

The cooling-air temperature control device 70 is capable of adjusting the air to a desired cooling temperature, at which the air is to be blown into the cooling tunnel 24. Depending on the initial temperature of the exterior air, this air is cooled or heated for this purpose.

Figure 7:
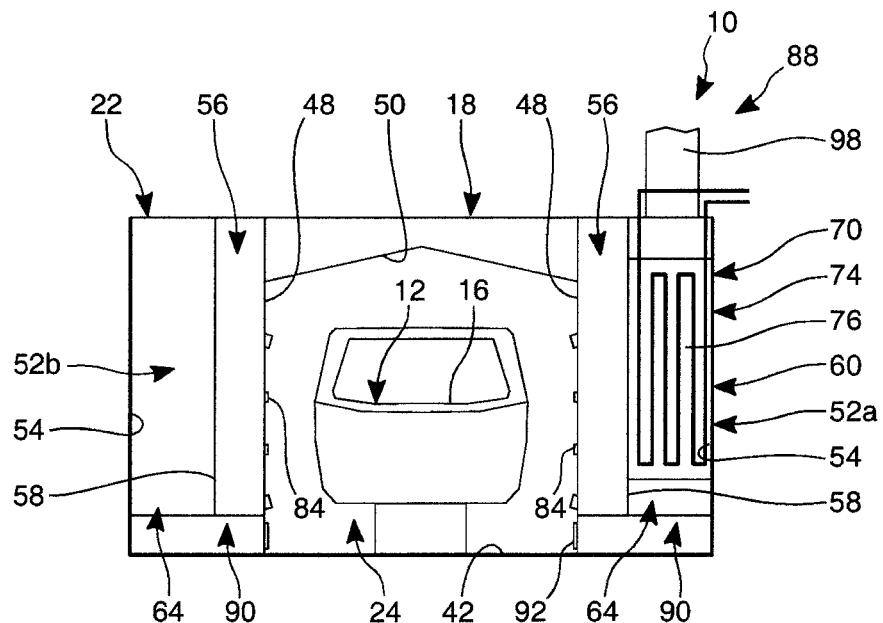
FIG. 7 shows a cross section of the cooling zone along section line VII-VII in FIG. 3.

In practice, the cooling-air temperature control device 70 comprises a heat exchanger arrangement 74. In the illustrative embodiment under consideration, the cooling-air temperature control device 70 comprises a hot-water heat exchanger 76 and a cold-water heat exchanger 78 arranged after the latter in the flow direction, said heat exchangers being combined operationally in a manner known per se in order to adjust the temperature of the exterior air flowing through to the required cooling temperature and to allow either heating or cooling of the air, depending on the exterior temperature. FIG. 7 shows a cross section with a view towards the hot-water heat exchanger 76.

As an alternative, it is also possible for the heat exchanger arrangement 74 to be designed as a combined heat exchanger for hot and cold water, in which there is automatic switching between a hot water supply and a cold water supply in a manner known per se. As mentioned at the outset, it is also possible, in the heat exchanger arrangement 74, to use fluid heat transfer media other than water; the terms "hot-water heat exchanger" and "cold-water heat exchanger" merely represent the respective temperature-controlling effect.

Figure 5:
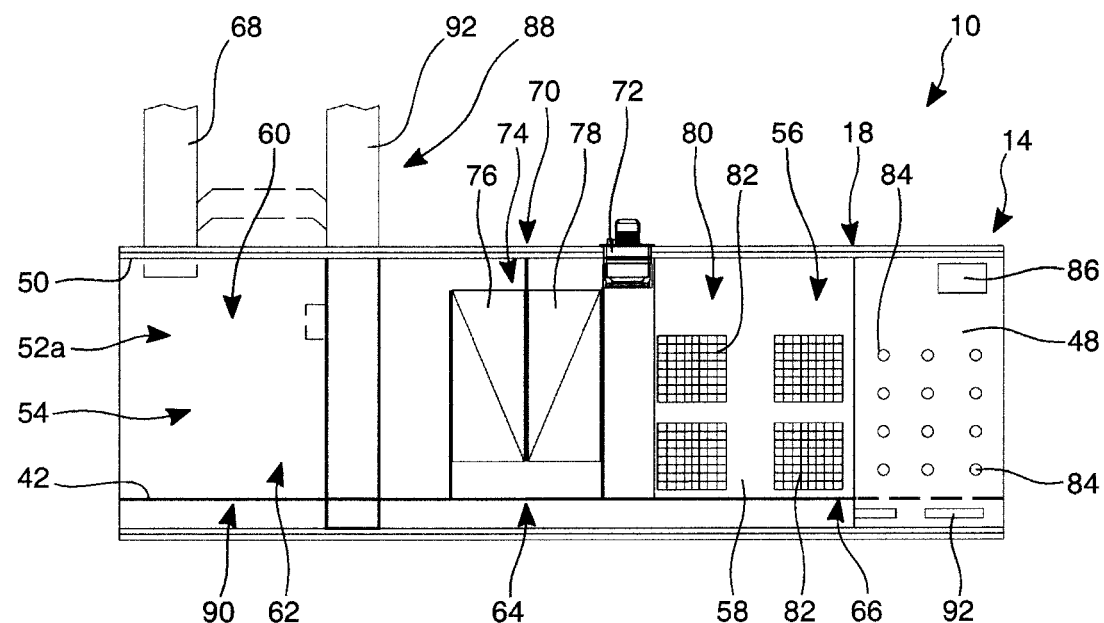
FIG. 5 shows a longitudinal section of the cooling zone along the angled section line V-V in FIG. 3.

In the region between the discharge region 66 of the conditioning chamber 60 and the pressure chamber 56, the partition wall 58 defines a filter wall 80 through which flow can take place, which connects the discharge region 66 fluidically to the pressure chamber 56 and which can be seen in a plan view in FIG. 5. The filter wall 80 comprises one or more filter units 82 through which flow can take place and which can be in the form of nonwoven mats or the like, for example. The blower 72 makes the temperature-controlled cooling air flow through the filter wall 80 into the pressure chamber 56.

Figure 4:
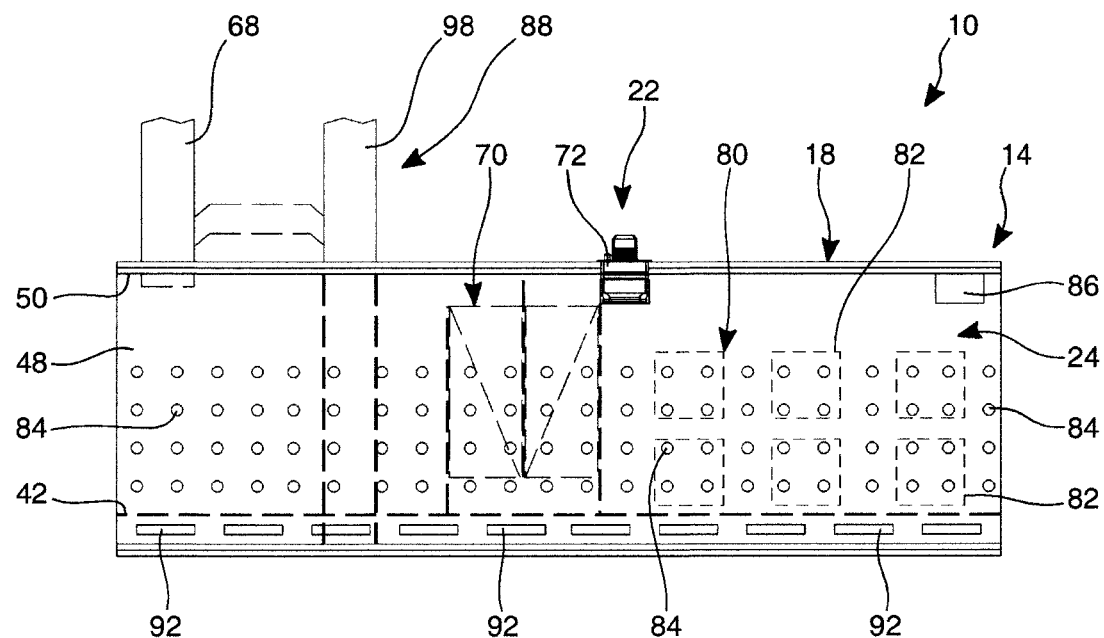
FIG. 4 shows a longitudinal section of the cooling zone along section line IV-IV in FIG. 3.

The lateral tunnel walls 48 have a multiplicity of air injection nozzles 84, which connect the pressure chamber 56 fluidically to the cooling tunnel 24 and not all of which bear a reference sign in the figures. The section according to FIG. 4 shows the air injection nozzles 84 in a plan view, wherein the cooling-air temperature control device 70 and the filter wall 80 are depicted as transparent. The air injection nozzles 84 form flow passages through the lateral tunnel walls 48. The direction in which a respective air injection nozzle 84 discharges the cooling air from the pressure chamber 56 into the cooling tunnel 24 and onto the workpieces 12 to be cooled can be adjustable. For this purpose, it is possible, for example, for the air injection nozzles 84 to have an inner part which is designed as a spherical cap and is mounted in the lateral tunnel wall 48, thus enabling the alignment of the air injection nozzle 84 to be varied.

Figure 3:
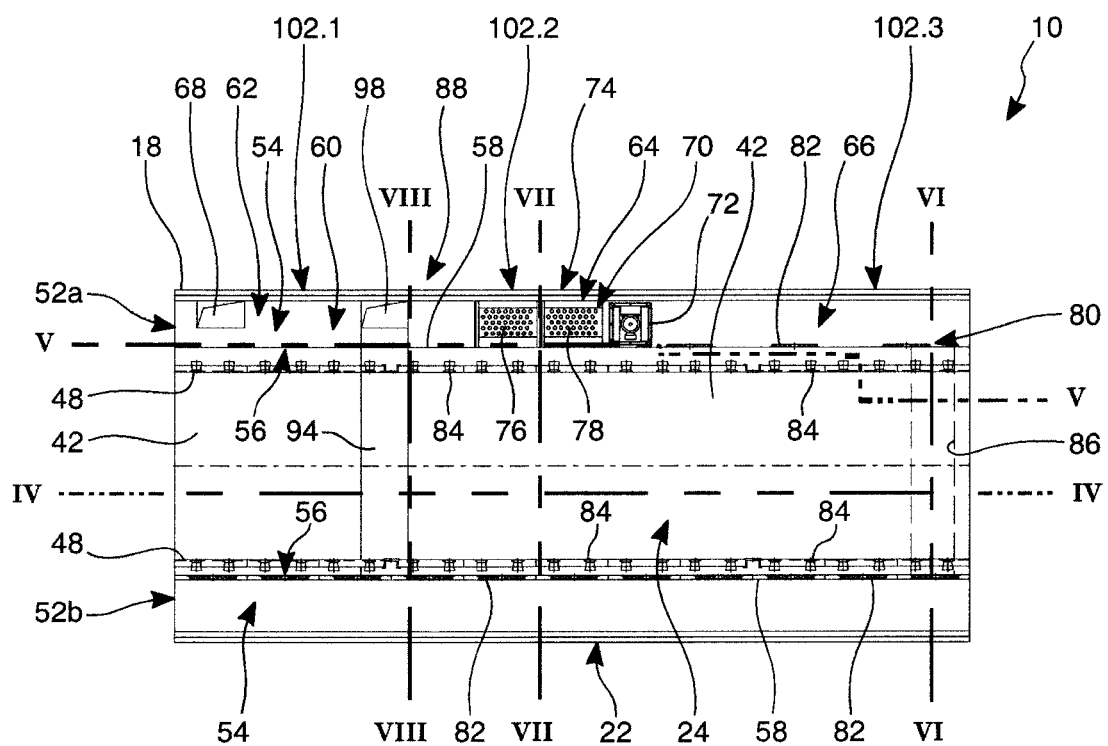
FIG. 3 shows a plan view of the cooling tunnel viewed in the direction of plane III in FIG. 1, wherein one of the two supply chambers defines an equipment chamber in which a cooling-air temperature control device is arranged.
Figure 6:
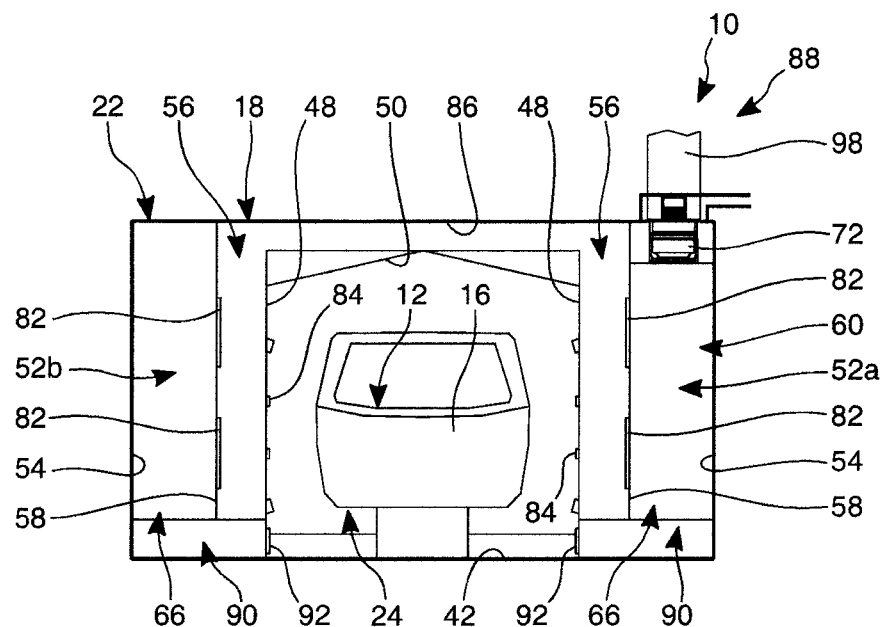
FIG. 6 shows a cross section of the cooling zone along section line VI-VI in FIG. 3.

As can be seen in FIGS. 3 and 6, the pressure chamber 56, which is connected to the conditioning chamber 60, is connected fluidically via a connecting duct 86 to the pressure chamber 56, which belongs to the supply chamber 52b on the opposite side of the cooling tunnel 24. The connecting duct 86 is arranged close to the outlet of the cooling tunnel 24 and, in the illustrative embodiment under consideration, spans the cooling tunnel 24. In modifications that are not shown specifically, it is also possible for there to be a plurality of connecting ducts 86, with the result that a plurality of flow paths is formed in the longitudinal direction of the cooling tunnel 24 between the two distributor chambers 56 of the supply chambers 52a and 52b.

In a modification, it is also possible for the connecting duct 86 to connect the discharge chamber 56 of supply chamber 52a to the inlet chamber 54 of supply chamber 52b, in which case filter units 82 are then arranged there in the partition wall 58. In FIG. 3, this variant is indicated by dashed extensions of the connecting duct 86 and corresponding filter units 82 in the partition wall 58.

FIGS. 1, 3, 4 and 8 illustrate an exhaust air device 88 of the cooling zone 22, by means of which the tunnel atmosphere can be discharged as exhaust air from the cooling tunnel 24. The exhaust air device 88 comprises a collecting duct 90, which extends below supply chamber 52a, parallel to the cooling tunnel 24 and substantially over the entire length of the latter. However, it is also possible for the collecting duct 90 to be provided only along a section of the cooling tunnel 24. The collecting duct 90 is connected to the cooling tunnel 24 by a plurality of extraction passages 92, enabling the tunnel atmosphere to be extracted as exhaust air from the floor region of the cooling tunnel 24. An extraction duct 94 is furthermore formed on the tunnel roof 50 in the inlet region of the cooling tunnel 24, the duct spanning the cooling tunnel 24 transversely to the conveying direction 27 and likewise being connected by a plurality of extraction passages 92 to the cooling tunnel 24, thus enabling exhaust air to be extracted there from the roof region of the cooling tunnel 24 in order to avoid the formation of condensate on the tunnel roof 50.

The collecting duct 90 is connected to an exhaust air duct 98, via which the extracted exhaust air can be discharged from the dryer 14. As FIGS. 4 and 5 illustrate, the exhaust air duct 98 can be connected to the inlet air duct 68, thus enabling exhaust air from the cooling tunnel 24 to be mixed into the inlet air in the inlet air duct 68, ensuring that exhaust air is at least partially recirculated in a circuit. The proportion of exhaust air which flows into the inlet air duct 68 can be adjusted with the aid of a valve (not shown specifically). If required, it is also possible for inflow of exterior air to be stopped by a corresponding valve, with the result that only recirculated exhaust air flows into the intake region 62 of the conditioning chamber 60.

Figure 8:
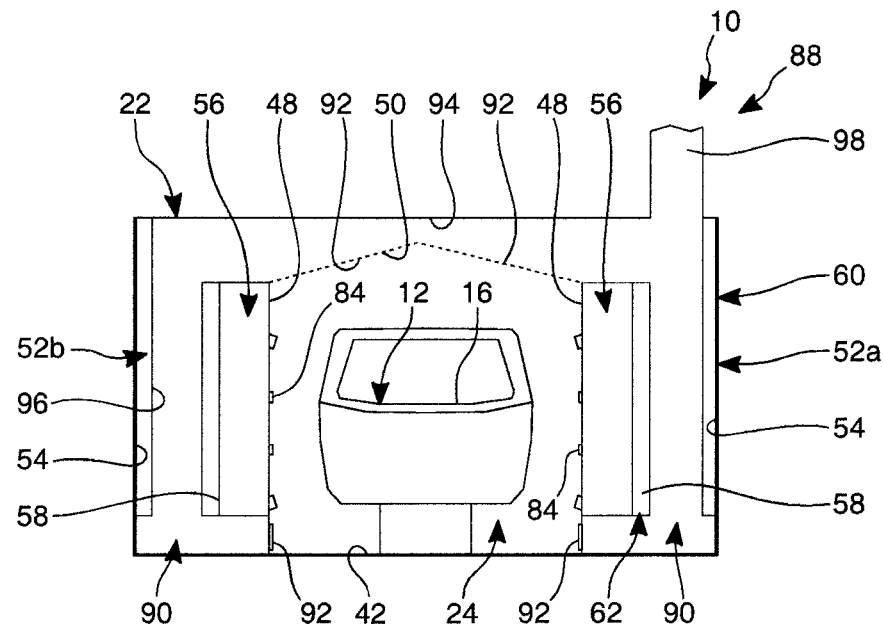
FIG. 8 shows a cross section of the cooling zone along section line VIII-VIII in FIG. 3.

FIG. 8 illustrates a supplementary alternative, in which a collecting duct 90 having extraction passages 92 also extends below the supply chamber 52b on the opposite side of the cooling tunnel 24, said duct being connected by a flow line 96 to the extraction duct 94 on the tunnel roof 50. In this way, tunnel air is extracted at the floor on both sides in the longitudinal direction of the cooling tunnel 24 and carried to the collecting duct 90 below supply chamber 52a and onward into the exhaust air duct 94. It is also possible for there to be one or more connecting ducts between the two collecting ducts 90 on both sides of the cooling tunnel 24 in order to transfer the exhaust air from the side of supply chamber 52b to the collecting duct 90 under supply duct 52a and onward into the exhaust air duct 98.

Figure 9:
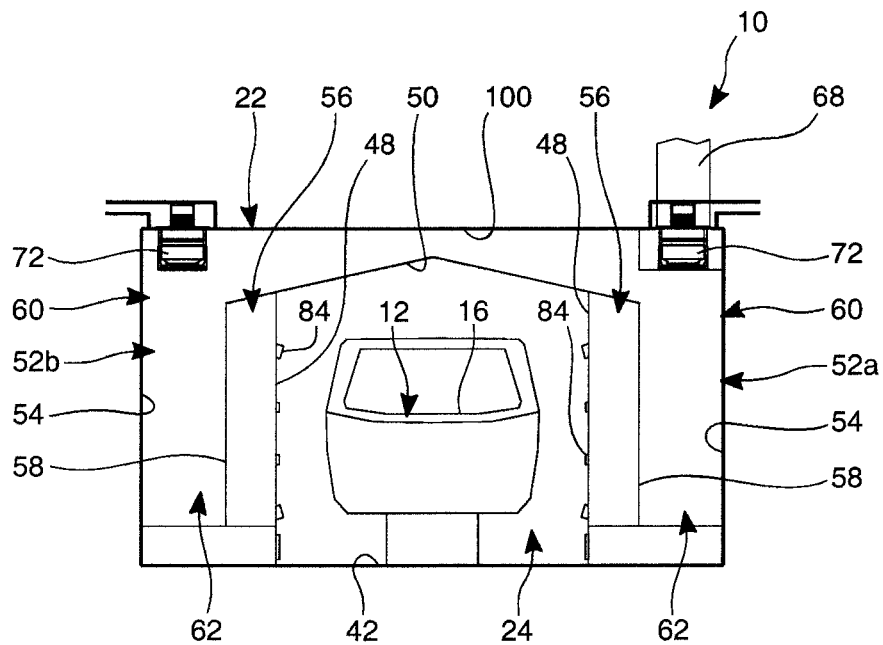
FIG. 9 shows a cross section of a modified cooling zone, in which both supply chambers comprise an equipment chamber.

FIG. 9 illustrates a modification in which the supply chambers 52a and 52b are of similar construction on both sides of the cooling zone 22. In this case, therefore, supply chamber 52b is of similar design to supply chamber 52 and is fitted with corresponding components, and therefore both supply chambers 52a, 52b are designed as conditioning chambers 60. FIG. 9 shows a cross section at the level of the opposite intake region 62 of the respective conditioning chambers 60 of the supply chambers 52a and 52b. By way of example, there are also blowers 72 there in both intake regions 62, which can be present instead of or in addition to the blowers 72 downstream of the cooling-air temperature control device 70.

If there is a plurality of blowers 72, they can be fitted with frequency converters and volume flow measuring devices, making it possible to implement air injection speeds of the temperature-controlled cooling air into the cooling tunnel 24 which are matched to different types of object 12, in particular different vehicle bodies 16. If required, supplementary heating registers can be arranged in the pressure chamber 56, thus enabling a temperature gradient of the cooling air to be produced in the longitudinal direction 27, allowing slow and particularly low-stress cooling.

The two supply chambers 52a and 52b can each be connected to a separate inlet air duct 68 and exhaust air duct 98. FIG. 9 shows the alternative in which there is only one inlet air duct 68, through which the exterior air enters the intake region 62 of supply chamber 52a. The intake region 62 of supply chamber 52a is connected to the intake region 62 of supply chamber 52b by an inlet air connecting duct 100.

In the case of the illustrative embodiment shown in FIGS. 1 and 3 to 8, the inlet chamber 54 of supply chamber 52b is not used for the flow path of the cooling air but merely accommodates the exhaust air duct 94 if a flow connection is provided between two collecting ducts 90 on both sides of the cooling tunnel 24.

Figure 10:
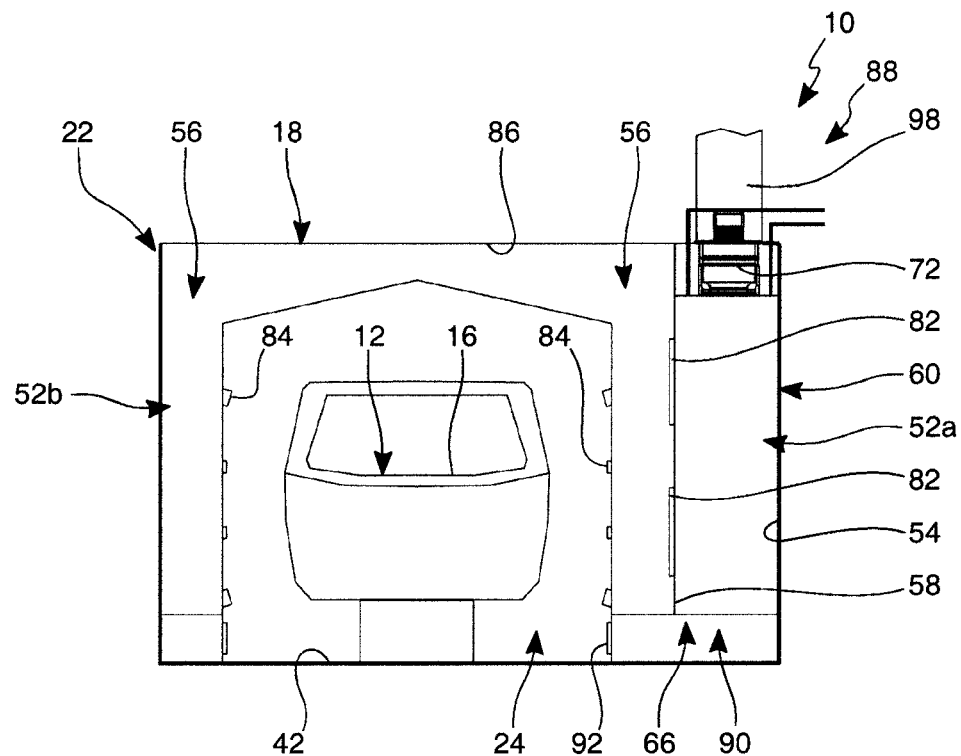
FIG. 10 shows a cross section of a modified cooling zone, in which the supply chambers are of different designs.

If required, the inlet chamber 54 in supply chamber 52b can therefore be omitted, supply chamber 52b thus comprising only the pressure chamber 56 there. This illustrative embodiment is illustrated in FIG. 10 with a cross section corresponding to the cross section in FIG. 6.

Figure 11:
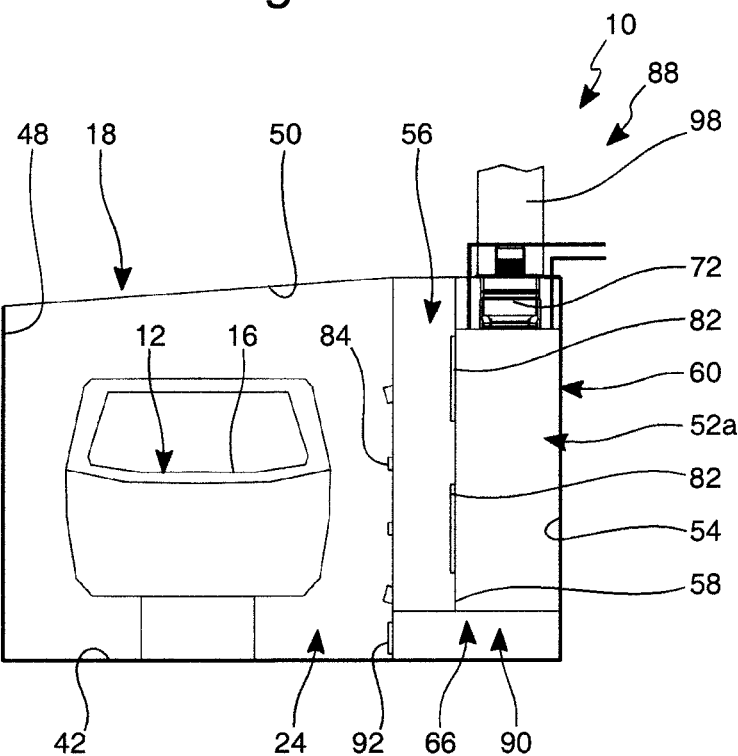
FIG. 11 shows a cross section of a modified cooling zone, in which a supply chamber is provided on only one longitudinal side.

FIG. 11 illustrates a variant in which there is a supply chamber 52 on only one side of the cooling tunnel 24, there being no supply chamber on the opposite side. There is therefore also no pressure chamber 56 there and there are also no air injection nozzles 84 in the opposite lateral tunnel wall 48. The cooling air enters the cooling tunnel 24 from the discharge region 66 of the conditioning chamber 60 from only one side.

Only FIG. 1 shows that the cooling zone 22 of the dryer 14 can be constructed in modular fashion from a plurality of cooling zone modules 102, each of which has a module housing 104 in which a module tunnel 106 is accommodated. The module tunnel 106 of the cooling zone modules 102 arranged in series form the cooling tunnel 24 of the dryer 14, i.e. each module tunnel 106 of a cooling zone module 102 defines one section of the cooling tunnel 24, wherein each module floor (not designated separately here) defines one section of the connecting passage 44 of the resulting tunnel floor 42. In corresponding fashion, the side walls and roof of the module tunnel 106 (likewise not designated separately here) each define one section of the lateral tunnel walls 48 and of the tunnel roof 50 of the resulting cooling zone 22. The cooling zone modules 102 are arranged within the cross section of the cooling zone 22 of the dryer 14. The cooling zone modules 102 are preferably also arranged within the cross section of the dryer 14 overall. In a corresponding way, each cooling zone module 102 defines one section of the supply chamber or chambers 52a or 52b and the inlet chambers 54 and distributor chambers 56 thereof and in each case one section of the partition wall 58.

In the illustrative embodiment under consideration, the cooling zone 22 comprises three cooling zone modules 102, of which a first cooling zone module 102 defines an intake module 102.1 comprising the intake region 62 of the supply chamber or chambers 52, a second cooling zone module 102 defines an equipment module 102.2 comprising the equipment region 64 of the supply chamber or chambers 52, and a third cooling zone module 102 defines a discharge module 102.3 comprising the discharge region 66 of the supply chamber or chambers 52, and therefore the inlet chamber 54 is obtained by arranging the three cooling zone modules 102.1, 102.2 and 102.3 in series and connecting them to one another operationally.

In the present case, a cooling zone module 102 of this kind can be preassembled as a constructional unit, thus enabling the dryer 14 or the cooling zone 22 thereof to be assembled at the site of operation by joining together the preassembled cooling zone modules 102. As an alternative, it is also possible for a cooling zone module 102 to be formed only during the installation of the dryer 14 or of the cooling zone 102.

In the case of preassembled cooling zone modules 102, these are fitted with mutually complementary connections for fluid lines and electric lines, which must be available as supplies for the operation of the dryer 14 or cooling zone 22.

Both the inlet air duct 68 and the exhaust air duct 98 can also be arranged at different positions along the cooling zone 22 and also do not need to run vertically, as depicted in the figures. The specific position and specific course of the ducts depend inter alia on local circumstances.

While this invention is susceptible to embodiments in many different forms, there is described in detail herein, preferred embodiments of the invention with the understanding that the present disclosures are to be considered as exemplifications of the principles of the invention and are not intended to limit the broad aspects of the invention to the embodiments illustrated.

What is claimed is:

1. A temperature control apparatus for controlling a temperature of objects, comprising:
   a) a housing, in which a cooling zone having a cooling chamber that defines a longitudinal direction is accommodated;
   wherein
   b) the cooling chamber is assigned at least one cooling-air temperature control device, by means of which temperature-controlled cooling air can be produced, which can be fed to the cooling chamber,
   further wherein
   c) the cooling zone comprises a supply chamber in the longitudinal direction on one longitudinal side of the cooling chamber, in which supply chamber the at least one cooling-air temperature control device is arranged, and
   d) the supply chamber comprises a conditioning chamber and a pressure chamber connected fluidically thereto, wherein the at least one cooling-air temperature control device is arranged in an equipment region of the conditioning chamber and is connected fluidically on its outlet side to the pressure chamber, wherein the pressure chamber is physically arranged between the cooling chamber and the conditioning chamber and is connected fluidically to the cooling chamber by one or more air injection nozzles.

2. The apparatus according to claim 1, wherein the conditioning chamber comprises an intake region, to which an inlet side of the at least one cooling-air temperature control device is fluidically connected and to which air can be fed.

3. The apparatus according to claim 1, wherein one or more filter units, through which the temperature-controlled cooling air can flow, are arranged between the conditioning chamber and the pressure chamber.

4. The apparatus according to claim 1, wherein the conditioning chamber comprises a discharge region, to which an outlet side of the at least one cooling-air temperature control device is connected and which is separated from the pressure chamber by a filter wall which comprises one or more filter units.

5. The apparatus according to claim 1, wherein the pressure chamber extends substantially over the length of the cooling chamber in the longitudinal direction.

6. The apparatus according to claim 1, wherein at least one blower, by means of which air can be delivered to the at least one cooling-air temperature control device, through the at least one cooling-air temperature control device and then into the cooling chamber as temperature-controlled cooling air, is arranged in the supply chamber.

7. The apparatus according to claim 1, wherein the at least one cooling-air temperature control device comprises a heat exchanger arrangement.

8. The apparatus according to claim 7, wherein the heat exchanger arrangement comprises a hot-water heat exchanger and a cold-water heat exchanger, or is designed as a combined heat exchanger for hot water and cold water.

9. The apparatus according to claim 1, wherein the cooling chamber is constructed with the aid of one or more cooling zone modules, of which at least one is designed as an equipment module, in which the at least one cooling-air temperature control device can be accommodated, and/or at least one is designed as a discharge module and/or at least one is designed as an intake module.

10. The apparatus according to claim 9, wherein the discharge module comprises a discharge region, to which an outlet side of the at least one cooling-air temperature control device is connected and which is separated from the pressure chamber by a filter wall which comprises one or more filter units.

11. The apparatus according to claim 9, wherein the intake module comprises an intake region, to which an inlet side of the at least one cooling-air temperature control device is fluidically connected and to which air can be fed.

12. The apparatus according to claim 1, wherein the supply chamber is formed on both sides of the cooling chamber.

13. The apparatus according to claim 1, wherein the pressure chamber is positioned between the cooling chamber and the conditioning chamber such that, a first side of the pressure chamber is bound by a first wall which also bounds the cooling chamber, and a second side of the pressure chamber is bound by a wall which also bounds the conditioning chamber.

\* \* \* \* \*